US010587806B2

(12) United States Patent
Bigioi et al.

(10) Patent No.: US 10,587,806 B2
(45) Date of Patent: *Mar. 10, 2020

(54) METHOD AND APPARATUS FOR MOTION ESTIMATION

(71) Applicant: FotoNation Limited, Galway (IE)

(72) Inventors: Petronel Bigioi, Galway (IE); Peter Corcoran, Claregalway (IE); Piotr Stec, Galway (IE)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,657

(22) Filed: Mar. 11, 2019

(65) Prior Publication Data
US 2019/0273867 A1 Sep. 5, 2019

Related U.S. Application Data

(63) Continuation of application No. 14/777,384, filed as application No. PCT/EP2014/055125 on Mar. 14, 2014, now Pat. No. 10,229,504.

(Continued)

(51) Int. Cl.
H04N 19/53 (2014.01)
H04N 5/232 (2006.01)
G06T 7/223 (2017.01)

(52) U.S. Cl.
CPC ......... *H04N 5/23254* (2013.01); *G06T 7/223* (2017.01); *H04N 5/23229* (2013.01);
(Continued)

(58) Field of Classification Search
CPC .......... G06T 7/223; G06T 2207/20068; G06T 2207/20021; G06T 2207/20012;
(Continued)

(56) References Cited

U.S. PATENT DOCUMENTS 6,130,912 A * 10/2000 Chang .................... H04N 5/145
348/E5.066
2005/0275727 A1* 12/2005 Lai ...................... H04N 5/23248
348/208.1

(Continued)

OTHER PUBLICATIONS

Sauer, Ken, and Brian Schwartz. "Efficient block motion estimation using integral projections." IEEE Transactions on circuits and systems for video technology 6, No. 5 (1996): 513-518. (Year: 1996).*

(Continued)

*Primary Examiner* — Carol Wang

(57) ABSTRACT

A method of estimating motion between a pair of image frames of a given scene comprises calculating respective integral images for each of the image frames and selecting at least one corresponding region of interest within each frame. For each region of interest, an integral image profile from each integral image is calculated, each profile comprising an array of elements, each element comprising a sum of pixel intensities from successive swaths of the region of interest for the frame. Integral image profiles are correlated to determine a relative displacement of the region of interest between the pair of frames. Each region of interest is divided into a plurality of further regions of interest before repeating until a required hierarchy of estimated motion for successively divided regions of interest is provided.

19 Claims, 10 Drawing Sheets

Related U.S. Application Data

(60) Provisional application No. 61/803,115, filed on Mar. 18, 2013.

(52) U.S. Cl.
CPC .... *H04N 19/53* (2014.11); *G06T 2207/10016* (2013.01); *G06T 2207/20012* (2013.01); *G06T 2207/20016* (2013.01); *G06T 2207/20021* (2013.01); *G06T 2207/20068* (2013.01)

(58) Field of Classification Search
CPC .......................................... G06T 2207/10016; G06T 2207/20016; H04N 5/23254; H04N 5/23229; H04N 19/53
See application file for complete search history.

(56) References Cited

U.S. PATENT DOCUMENTS

| | | | | |
|---|---|---|---|---|
| 2007/0237514 A1* | 10/2007 | Pillman | ................... | G03B 7/00 396/153 |
| 2008/0159630 A1* | 7/2008 | Sharon | ...................... | G06T 7/13 382/199 |
| 2008/0273752 A1* | 11/2008 | Zhu | ....................... | B60W 40/02 382/103 |
| 2009/0058990 A1* | 3/2009 | Kim | ........................ | G03B 37/04 348/36 |
| 2010/0111446 A1* | 5/2010 | Lim | ..................... | G06K 9/4647 382/305 |
| 2013/0016180 A1* | 1/2013 | Ono | ....................... | H04N 5/145 348/36 |
| 2013/0076921 A1* | 3/2013 | Owen | ................ | H04N 5/23258 348/208.4 |

OTHER PUBLICATIONS

Nguyen, Viet Anh, and Yap-Peng Tan. "Fast block-based motion estimation using integral frames." IEEE signal processing letters 11, No. 9 (2004): 744-747. (Year: 2004).*

Kumar, Jayant, and David Doermann. "Fast rule-line removal using integral images and support vector machines." In 2011 International Conference on Document Analysis and Recognition, pp. 584-588. IEEE, 2011. (Year: 2011).*

* cited by examiner

METHOD AND APPARATUS FOR MOTION ESTIMATION

FIELD OF THE INVENTION

The present invention relates to a method and apparatus for motion estimation.

BACKGROUND

WO2008/151802 (Reference: FN-174) and WO2011/069698 (Reference: FN-352) disclose correlating profiles for respective image frames in a video sequence to determine relative movement between the image frames—the movement comprising either camera movement or subject movement. Providing a global measure of frame-to-frame motion however, has limited application.

Thus, it can be useful to provide information indicating both global and local motion within blocks or regions of an image sequence. There are many methods of motion estimation that use a hierarchical approach to find local block motion in a sequence of video frames.

There are two typical approaches:

Image Pyramids, for example as disclosed in U.S. Pat. No. 6,459,822, where the image is decomposed into a so called Gaussian pyramid where each level of the pyramid is a downscaled version of the previous level. A usual scale factor between levels is 2. The displacement between corresponding blocks is found by correlating pixel values between blocks. Apart from the amount of memory that is needed to store the image pyramid, this is a computationally intensive process, even if employing a small search radius.

Variable block size, where an image is kept in its original size but the search blocks get smaller with every search iteration and also the search radius is reduced, allowing for more precise estimation. The problem with this approach is that image pixels have to be accessed multiple times and numerical complexity of each iteration is high.

U.S. Pat. No. 8,200,020 B1 discloses a computing device selecting a source tile from a source image. From the source tile, the computing device may select a first rectangular feature and a second rectangular feature. Based on the first and second rectangular features, the computing device may calculate a source feature vector. The computing device may also select a search area of a target image, and a target tile within the within the search area. Based on the target tile, the computing device may calculate a target feature vector. The computing device may determine that a difference between the source feature vector and the target feature vector is below an error threshold, and based on this determination, further determine a mapping between the source image and the target image. The computing device may then apply the mapping to the source image to produce a transformed source image.

U.S. Pat. No. 6,809,758 discloses stabilizing a motion image formed using a sequence of successive frames which includes calculating a motion vector field between adjacent frames; forming a motion vector histogram from horizontal and vertical components of the motion vector field; applying a threshold to the motion vector histogram to produce a thresholded motion vector histogram; generating average horizontal and vertical motion components from the thresholded motion vector histogram; filtering the average horizontal and vertical motion components over a number of frames to identify unwanted horizontal and vertical motion components for each of the frames; and stabilizing the image sequence by shifting each frame according to the corresponding unwanted horizontal and vertical motion.

SUMMARY

According to a first aspect of the present invention there is provided a method of estimating motion between a pair of image frames of a given scene according to claim 1.

This aspect of the invention employs an integral image derived from each image frame to determine relative motion between image frames at a number of levels of a hierarchy of image regions. The motion between corresponding regions is not found directly using image correlation but with integral image profiles. An integral image profile is a linear array containing sums of intensities of all pixels within columns or rows from a region of interest of an image. Integral image profiles from corresponding regions are correlated in order to find displacement between regions.

As discussed, downscaling an image several times and keeping all down-scaled levels in a pyramid or hierarchy is impractical in embedded applications. Additionally, profiles built from those downscaled levels of image within the hierarchy would cause unnecessary memory traffic. This problem is effectively solved by using a single integral image per frame, sampled as required for each level of the hierarchy to produce a hierarchical displacement map.

In embodiments, each of the levels of the hierarchy is divided into one or more regions so that the number of regions increases for each level down the hierarchy, e.g. at a base level, the image is divided into 16×16 regions, the next level up, has 8×8, next 4×4 and so on. In some embodiments, sampling of the integral image information is scaled, so that each level is sampled at twice the resolution of the level above, so providing an ever finer estimate of motion for successively more localised regions of an image.

Embodiments of the invention optimize the building of the integral profiles for each block of the pyramid and so provide an efficient way of performing hierarchical motion estimation that minimizes the amount of memory and memory bandwidth requirements as well as reducing computational complexity.

According to a second aspect there is provided a method of estimating motion between a pair of image frames of a given scene according to each of claims 18 and 19.

These methods detect multiple motions within a single region of interest without subdividing it into sub-blocks and rebuilding the integral image profiles. They utilize the local minima of the error function between two corresponding regions of interest and additionally try to set approximate boundaries between objects contained within the region of interest.

According to a third aspect there is provided a method of estimating motion between a pair of image frames of a given scene according to claim 21.

Using this method, instead of starting motion estimation at the top of a pyramid, using an initial guess of motion based on a motion sensor built into the device, motion estimation is started one or more levels below a root level of the hierarchy.

There are also provided an image processing device and a computer program product arranged to perform the above referenced aspects of the invention.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
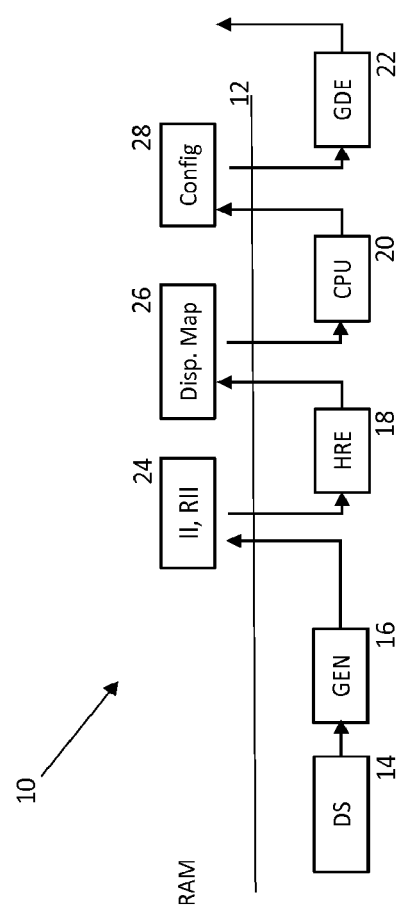
FIG. 1 is a block diagram of an image processing apparatus arranged to perform motion estimation according to an embodiment of the present invention.

Referring now to FIG. 1, there is shown schematically an image processing device 10 for performing motion estimation according to an embodiment of the present invention. The device includes a bus 12 which allows functional processing modules 14-22 (shown below the bus) to read and write information to memory 24-28 (shown above the bus). It should be noted that the modules 14-22 can incorporate local memory to facilitate internal processing.

Image frames are acquired via a down sampler (DS) 14 from an image sensor (not shown). The down sampler 14 may for example be a Gaussian down-sampler of the type provided by Fujitsu. The down-sampled image is fed to an integral image (II) generator (GEN) 16 which writes the II to memory 24. Calculation of integral image is well known and was originally disclosed by Viola, P. and Jones, M. in "Rapid Object Detection using a Boosted Cascade of Simple Features", Computer Vision and Pattern Recognition, 2001, Volume 1. Integral images are typically used in identifying objects such as faces in images, such as disclosed in WO2008/018887 (Reference: FN-143). As will be appreciated, only an intensity version of the original image is required to provide an integral image. This could be a grey scale version of the image, or it could be any single plane of a multi-plane image format, for example, RGB, LAB, YCC etc.

A hierarchical registration engine (HRE) 18 reads integral image information for a pair of frames from memory 24 and generates a displacement map 26 for the image pair as will be described in more detail below.

A CPU module 20 running an application program can then use displacement maps 26 for successive image frames to provide configuration information 28 required, for example, by a graphics distortion engine (GDE) 22 of the type described in WO 2014/005783 (Reference: FN-384) to provide image stabilization within a video sequence.

As will be seen, the HRE module 18 does not use the video frame directly but rather uses integral image information calculated from a down-sampled representation of the image frame. The HRE module 18 requires buffering of integral image information for two frames in memory 24, using one set of image information for a reference frame and calculating the displacement of region(s) of interest (ROI) within a target frame relative to the reference frame. As will be discussed in more detail later, in some embodiments, the reference frame can alternate temporally with the target frame, so that it precedes the target frame and then succeeds the target frame.

Figure 2:
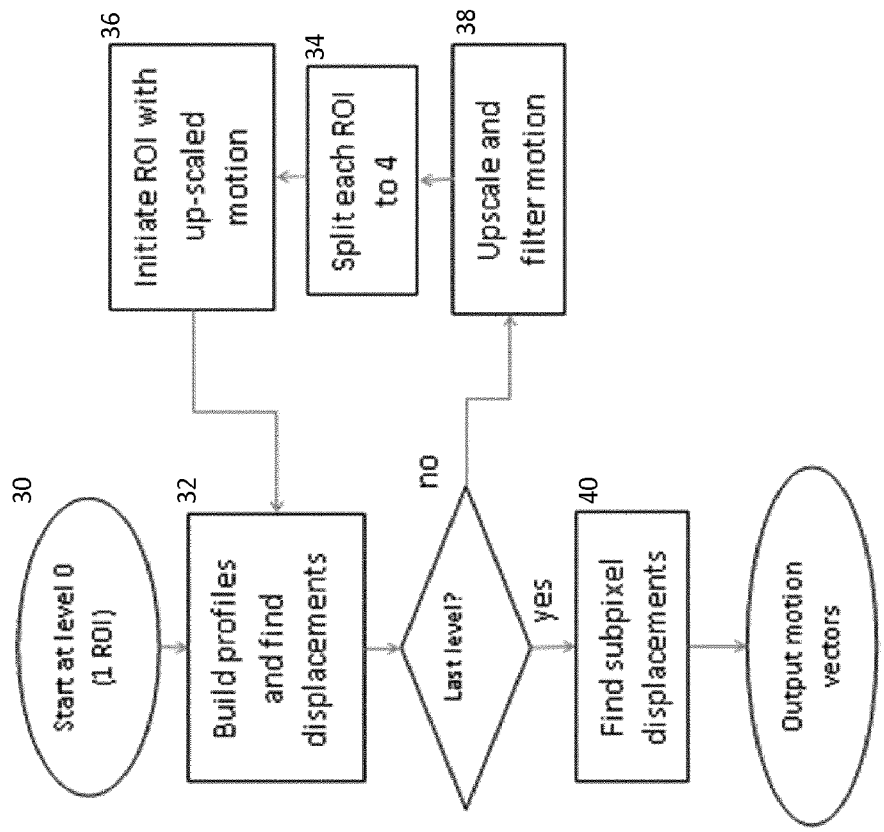
FIG. 2 is a flow diagram illustrating generally a method of motion estimation according to an embodiment of the present invention.

Referring to FIG. 2, the HRE module 18 performs a hierarchical search in order to find motion vectors for the regions of interest at each level of the hierarchy. It is coarse-to-fine approach where the search is performed first on integral image information for the complete image frame at a largest sub-sampling interval. Then the frame is split into a plurality of regions and the motion estimate for the complete frame is used as an initial guess for local motion in the individual regions; and so on down through the hierarchy.

Thus, starting with the complete image frame, step 30, the module 18 builds an integral image profile for each of the reference frame (R) and the target frame (T) based on integral image data 24 retrieved in memory, step 32. An integral image profile is an array that contains in each element, a sum of all pixel intensities in a corresponding swath, column or row—depending on the search direction, of a region of interest of an image. Typically, the integral image profile is stored locally within the HRE module 18, although it could be written back into general purpose memory if required.

Figure 3:
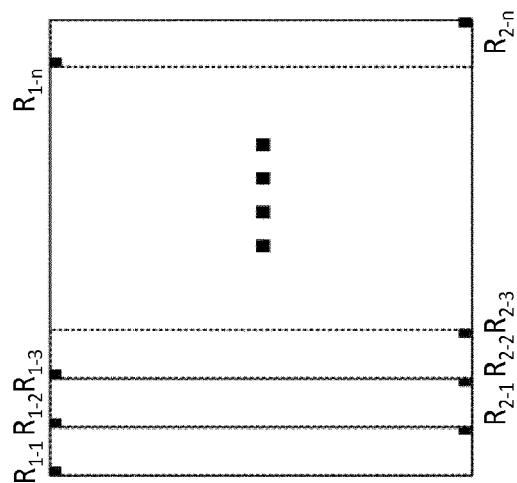
FIG. 3 shows the integral image pixels used to generate an integral image profile for a first iteration of the method of FIG. 2.

Referring to FIG. 3, in general, calculating the integral image profile for a given region of interest of the hierarchy involves sub-sampling the integral image along the first row of the ROI and subtracting these values $R_{1-x}$ from their sub-sampled values $R_{1-x}$ along the last row of the ROI, the top row values marking the top-left corner and the bottom row values marking the bottom-right corner of each swath providing a value within an integral image profile. In a top level of the hierarchy as shown in FIG. 3, as $R_{1-1}=0$, the profile value for the first column is simply $R_{2-1}$ and the profile value for the next column is simply $R_{2-2}-R_{2-1}$ and so on across the width of the image. As such, only the bottom row of integral image information needs to be sampled at the top level of the hierarchy to generate the integral image profile at this level. (A similar approach applies for determining vertical displacement.)

Figure 4:
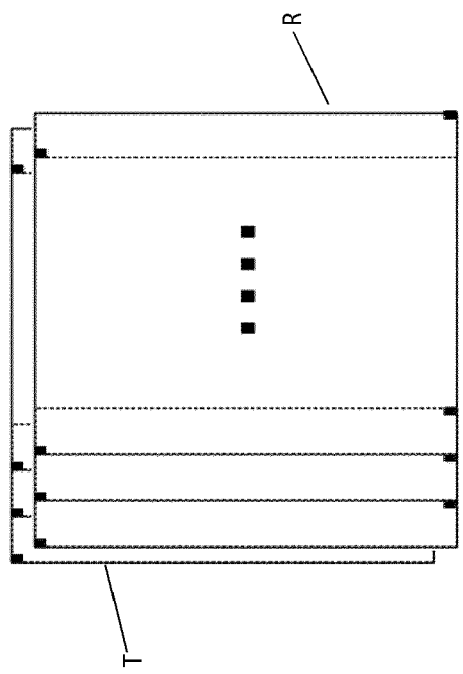
FIG. 4 illustrates a target image (T) displaced relative to a reference image (R)
Figure 5:
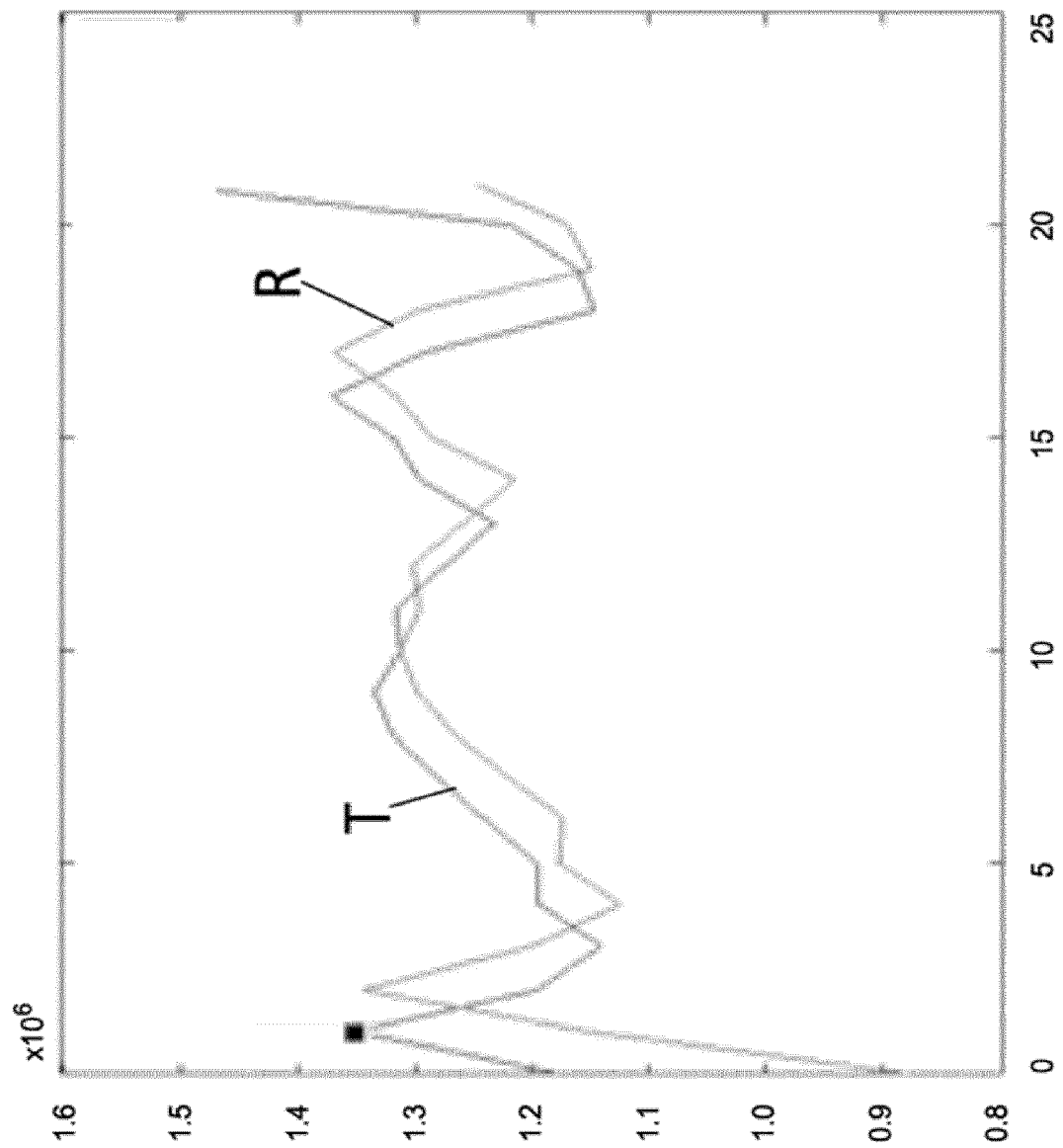
FIG. 5 illustrates exemplary integral image profiles for a pair of displaced images such as shown in FIG. 4.

FIG. 4 shows a pair of images T, R which are horizontally and vertically displaced and FIG. 5 shows horizontal integral image profiles T, R for these images. These integral image profiles can be readily correlated to determine the displacement of the target frame from the reference frame. (Again, the same operation is performed in order to find the vertical displacement but in this case, profiles are built by summing rows of the images.)

In embodiment of FIG. 2, each of the levels of hierarchy is sampled at ½ the resolution of the level lying directly below, with the coarsest full image version at the top of the hierarchy and the finest at the bottom. Thus in step 38, motion (in integral image samples) found at one level of the hierarchy, is multiplied by 2 and set as an initial estimate to the level below, its nominal inaccuracy in the absence of local movement being ±1 sample in each direction.

Although not applicable to the start level of the hierarchy where only 1 motion vector indicating horizontal and vertical displacement might be produced, in lower levels of the hierarchy where a matrix of motion vectors is produced (FIG. 14), in some embodiments, at step 38, a low pass filter can be applied to the matrix to reduce the influence of outliers.

Looking in one dimension, a row of displacement values A-D from one level are upscaled to produce a row of start displacement values a-h for the next level:

| A | | B | | C | | D | |
|---|---|---|---|---|---|---|---|
| a | b | c | d | e | f | g | h |

For simple up-scaling, without filtering, the start displacement values can be calculated using the following pattern:

$b=(3*A+B)/4$ $c=(A+3*B)/4$ $d=(3*B+C)/4$ $e=(B+3*C)/4$; etc.

In order to filter, a simple Gaussian kernel [1 2 1] can be applied to the output values and substituting the calculations of a, b, c . . . we have two cases of final kernel that will repeat alternatively:

$c'=(5*A+10*B+C)/16$ $d'=(A+10*B+5*C)/16$ where c' and d' are values after low pass filtering. The multiplications used in above calculations can be easily decomposed to bit shifts and additions, for example, $5*A=(A<<2)+A$ and so this type of filter can be implemented without any multiplication making it very convenient for hardware implementation. (The same principle applies to column wise processing of the motion vectors.)

In the embodiment, each ROI is split into 4 new ROIs when going to the next level of the hierarchy, step 34, FIG. 2. Again, the subdivision level can vary and could be even dynamic, with variable or non-uniform ROI sizes.

Figure 6:
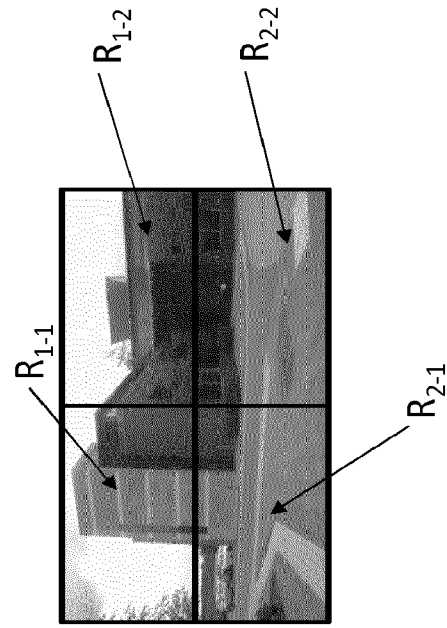
FIG. 6 shows displaced regions of interest (ROIs) at a second iteration of the method of FIG. 2.

FIG. 6 shows a layout of the ROIs after a first iteration of the method—reference frame (R) is shown on the right and the target frame (T) on the left. At this stage all four ROIs are initialized with the same motion, step 36, because it comes from a single vector determined from the analysis of the integral image information for the top level of the hierarchy. Thus, the image information for regions of interest of the target image (T) is taken from samples shifted relative to the samples of the reference image (R) according to the motion determined at the previous higher level of the hierarchy.

Figure 7:
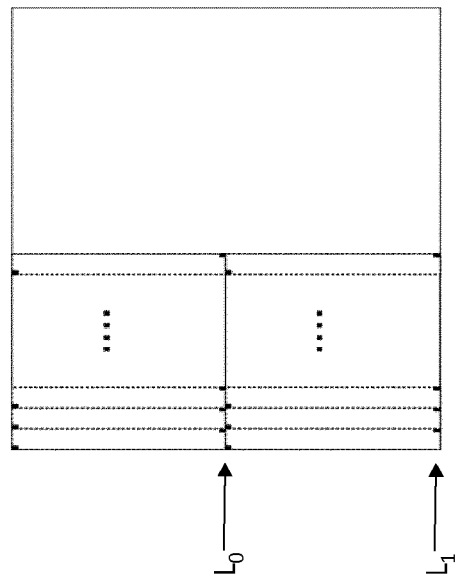
FIG. 7 shows the pixels required to build integral image profiles for the top and bottom left ROIs of a reference image (R) at a second iteration of the method of FIG. 2.

Again, profiles and displacements of the target image relative to the reference image are determined for each of the 4 regions of interest shown in FIG. 6, step 32. As illustrated in FIG. 7, the integral image profiles are built by sampling integral image points along the top and bottom rows of each of the 4 regions of the image. Importantly, however, the integral image information for the displaced regions of the target image is sampled from locations shifted according to the displacement detected for the region of interest bounding the current regions from the higher level of the hierarchy.

Once the integral image profiles for each of the regions of the target and reference images are built, motion for the second level can be determined again at step 32, before the process is repeated for the next level of the hierarchy at steps 38, 34 and 36.

Figure 8:
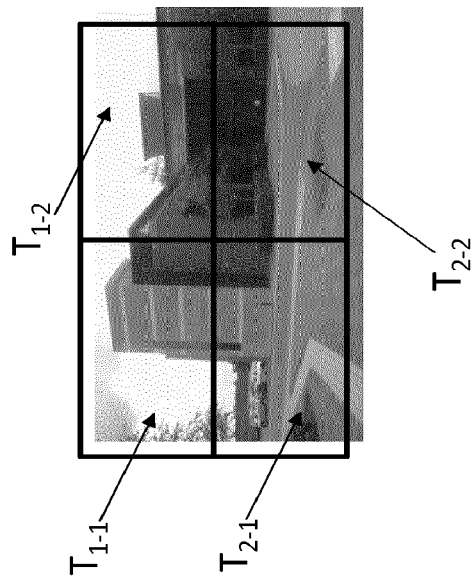
FIG. 8 shows displaced regions of interest (ROIs) at a third iteration of the method of FIG. 2.
Figure 8:
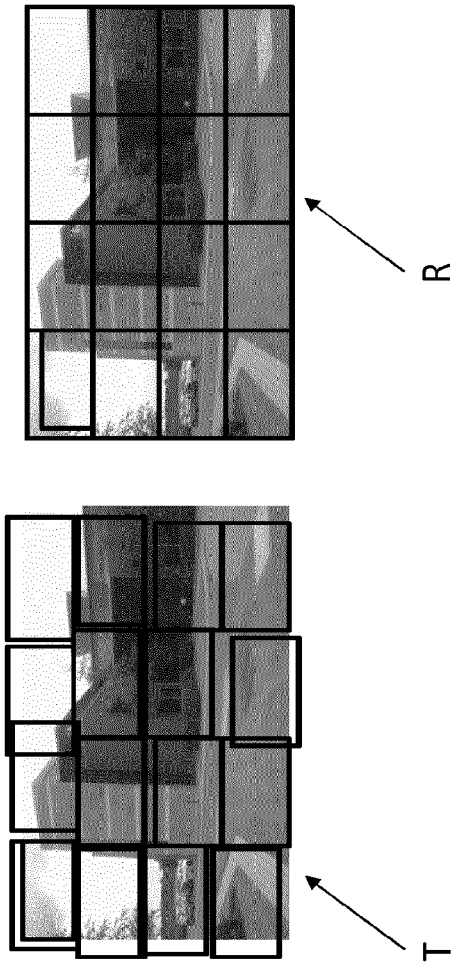

As shown in exaggerated form in FIG. 8, as processing proceeds through the hierarchy, motion estimation for the ROIs is no longer regular. As illustrated, movement of one ROI of the target image can be independent of the movement of another—this is especially true for scenes which involve moving objects.

So, in an exemplary implementation, for a topmost layer of the hierarchy, integral image information is sub-sampled and so downscaled 4 times compared to the original integral image resolution. To calculate the horizontal integral image profile, every $4^{th}$ pixel from the bottom most line of the integral image is sampled. By calculating differences between successive samples, integral image profile values are obtained. For an original frame size of 640×480, the top level of the pyramid would require 160 values for each image.

The blocks from the next lower level of the pyramid require every second line of pixels from the integral image to be sampled in order to calculate the required profiles. For example, to calculate profile from the bottom left quarter of the integral image at 50% of the original integral image resolution, every second pixel from the two lines $L_0$ and $L_1$, are read from the integral image as shown in FIG. 7. Thus, for a 640×480 image, up to 320 pixels of integral image information per ROI are required, which is still 60 times less bandwidth than traditional methods require.

Again, all calculations are performed analogously for determining displacement in the vertical direction.

This method of building the profiles allows for arbitrary location of image blocks within a target image and directly supports any integer downscaling factor of the original image without needing any additional processing.

Referring back to FIG. 2, once the method has completed processing for the lowest level of the hierarchy, which in this case at the $3^{rd}$ iteration samples each pixel of the integral images for the target and reference frames, it is also possible to determine sub-pixel displacement, step 40.

Aligning profiles with sub-pixel precision allows, for example, low resolution image information, for example, VGA to determine precise motion within a high resolution image, for example, Full HD.

Figure 9:
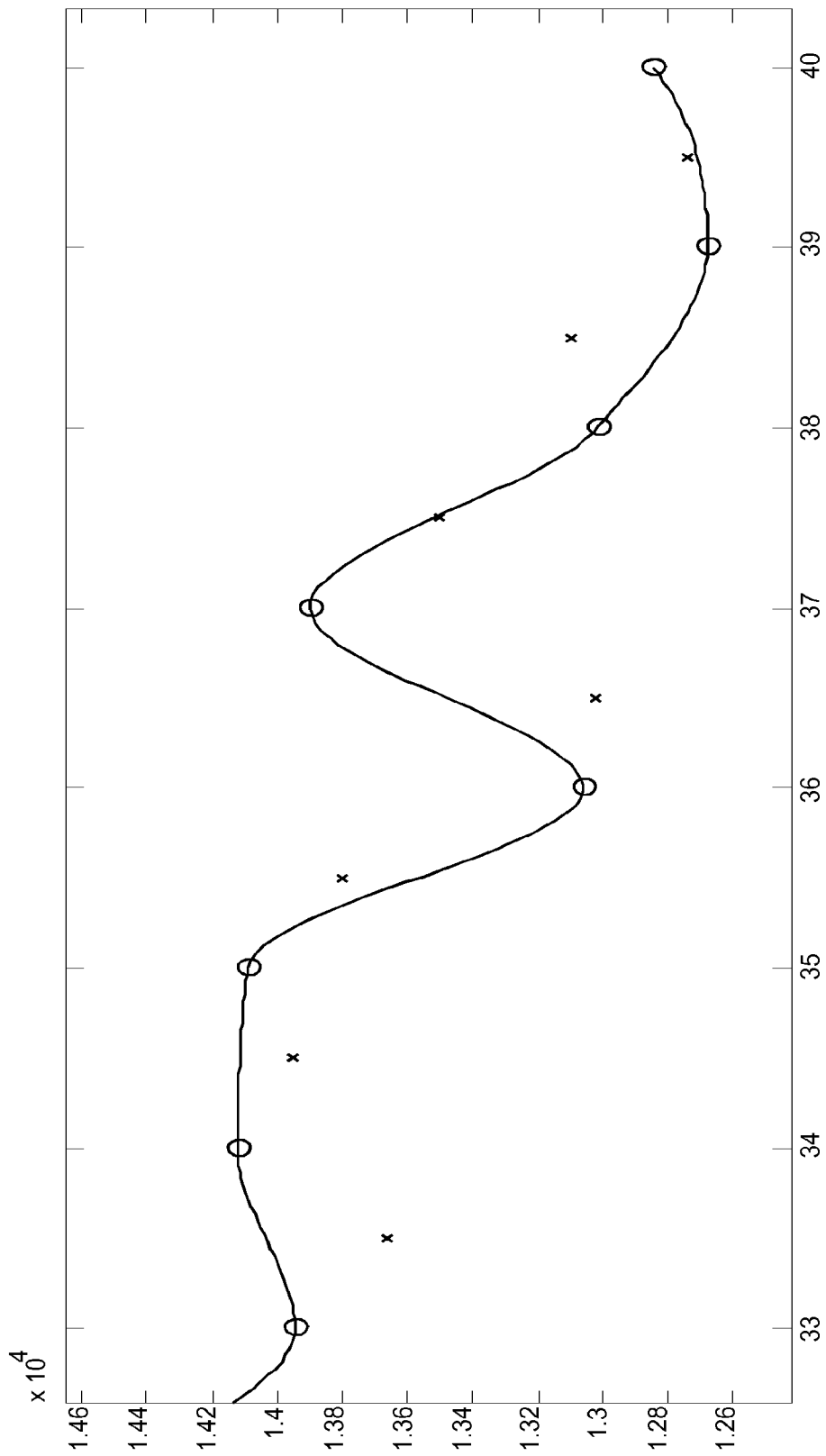
FIG. 9 illustrates an interpolated integral image profile.

To find sub-pixel shift, one of the integral image profiles for a region of interest is interpolated in order to determine the values of the pixels between original sampling intervals. In one implementation, cubic spline interpolation is employed. FIG. 9 shows original samples (circles) from a first profile interpolated to provide a continuous line profile. Samples from a second profile shifted by 0.5 of a pixel are shown as crossed. The displacement (error) is calculated as a mean absolute error (MAE) between values represented by the crosses and values of the blue line taken at corresponding locations. To save computation time, not all the values from the blue line are calculated. The function is evaluated only at the positions where error between two profiles must be evaluated.

Figure 10:
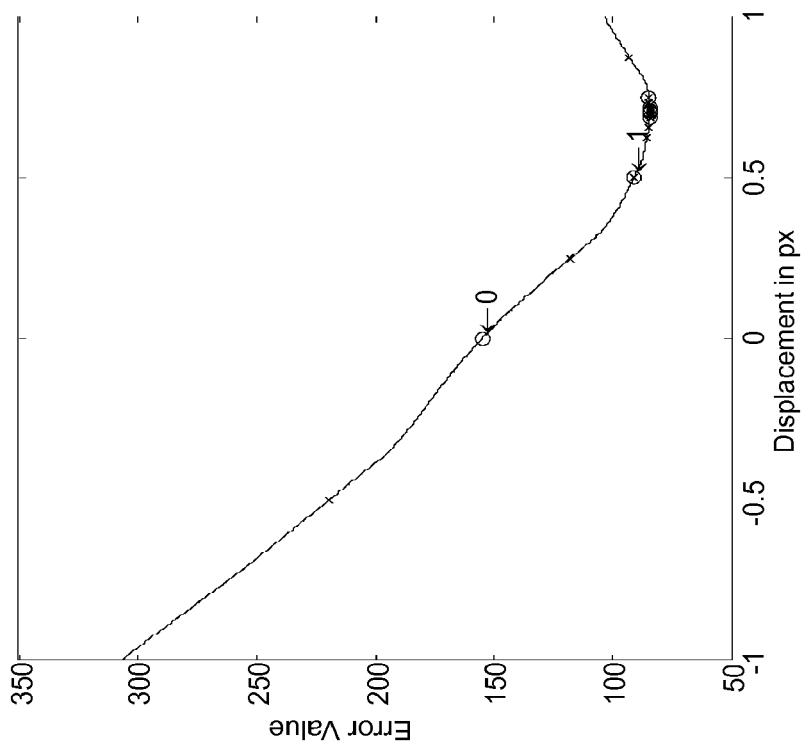

To find the sub-pixel shift for which MAE has minimal value, a binary search is employed. FIG. 10 shows how the error changes with the displacement between profiles. The point marked with 0 is the initial position for profiles that are aligned up to 1 pixel. The search starts with the initial step which is ±0.5 of the search range. Error values evaluated at those positions are compared and the current position is moved to the location of the lesser error.

Figure 11:
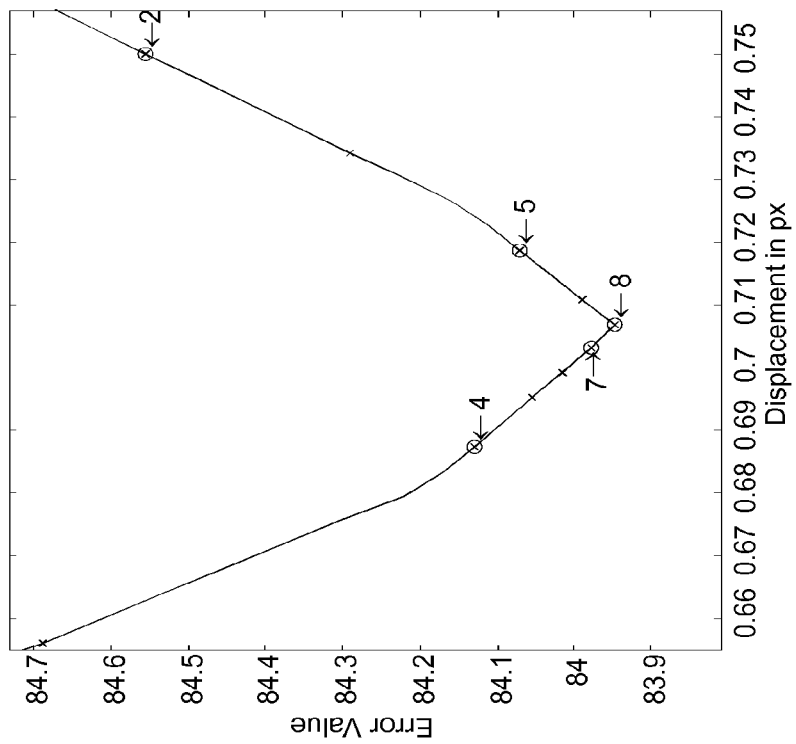
FIGS. 10 and 11 illustrate the calculation of sub-pixel displacement between profiles based on mean absolute error (MAE)

The operation is repeated for a fixed number of iterations that define required accuracy. To achieve 1/256 of a pixel accuracy, 8 iterations are used. The last steps of the search are shown in FIG. 11 and this determines that the displacement between the profiles is between 0.7 and 0.71 pixels.

As explained above, motion determined for upper levels of the image hierarchy is used as an initial guess for the underlying ROIs of lower levels. This however can lead to wrong initialization and unrecoverable estimation errors, especially if small search radiuses are employed i.e. if maximum permissible displacement is set too small to accommodate such errors. A typical case where such problem occurs is where there is a large, fast moving object inside the camera's field of view. If the object covers less than half of the video frame, the minimum of the profile correlation will indicate the motion of the background of the scene. Such situation is depicted in the FIG. 12 where the object is moving in a different direction than the background within an imaged scene.

In this situation, a single displacement measure of motion for the top level of the hierarchy would only reflect the background motion. This motion would be set as an initial guess for the next level of the pyramid containing regions marked as ROI 1-4. While it would provide adequate initialization for ROIs 1 and 3, using background displacement would provide incorrect initialisation for ROIs 2 and 4. Furthermore, this error would also be propagated to all lower levels of the hierarchy to all the regions descendant from ROIs 2 and 4.

Figures 12, 13:
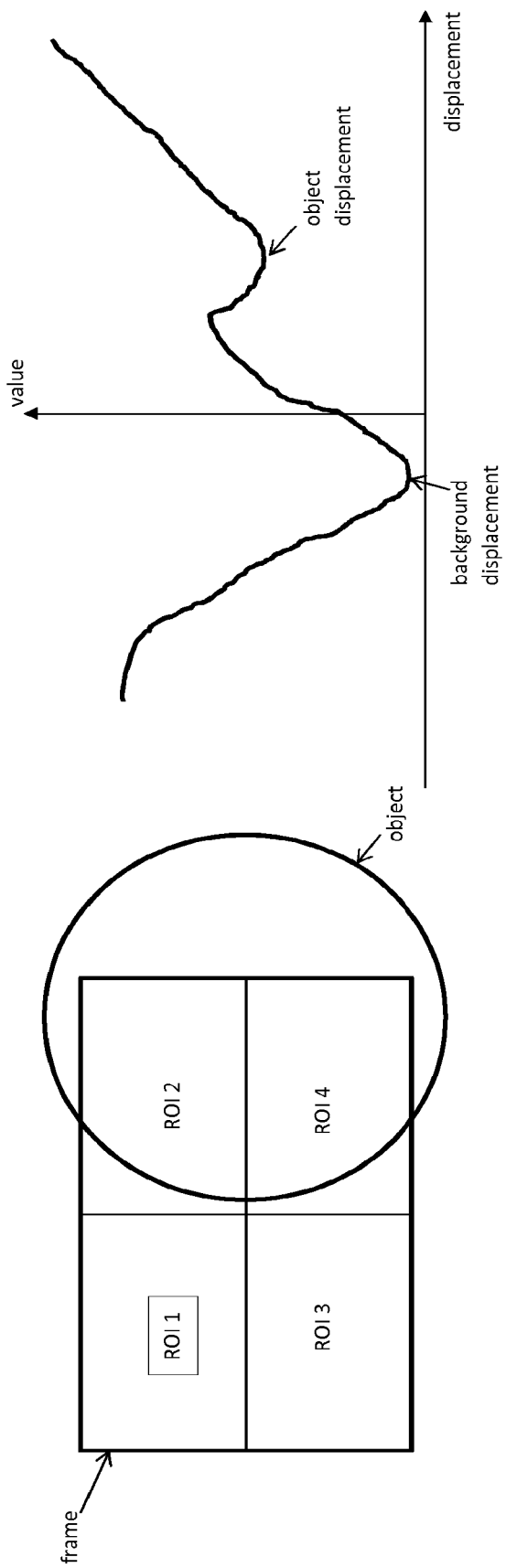
FIG. 12 shows an object covering significant part of an image frame.
FIG. 13 shows a profile indicating MAE with local minima for the image of FIG. 12.

FIG. 13 illustrates an MAE function for the integral images profiles for the top level of the hierarchy for the image of FIG. 12. As in the example for sub-pixel resolution above, the function is calculated by shifting one of the profiles in respect to the other and calculating a mean absolute error between displaced elements of the profiles. Unlike in the example of FIGS. 10 and 11, in this case, the function contains a local minimum as well as the global minimum. The global minimum reflects the most dominant motion, but the local minimum, in this case, reflects the object motion.

Calculating the absolute difference of the profiles shifted by the location of the minima, indicates the location of the moving object. This shows which part of the profile belongs to which object from the scene. This allows multiple motion values to be returned from the single profile correlation such as in step 32 of FIG. 2, and, as a consequence, allows for more accurate initialization of the underlying blocks from the lower level of the hierarchy.

Considering again the example from the FIG. 12, we can now see that the motion in the right part of the profile from the top level of the pyramid reflects different motion than the left part. Thus, unlike in the example illustrated in FIG. 6, where each of the 4 ROIs are provided with the same initial displacement values, the ROIs 2 and 4 can be now initialized with more appropriate displacement values.

It will be appreciated that this technique is also applicable in non-integral image based applications.

Equally, knowing the extent of the moving object allows for non-uniform splitting of a region of interest from one level of the hierarchy down to the next.

Figure 17:
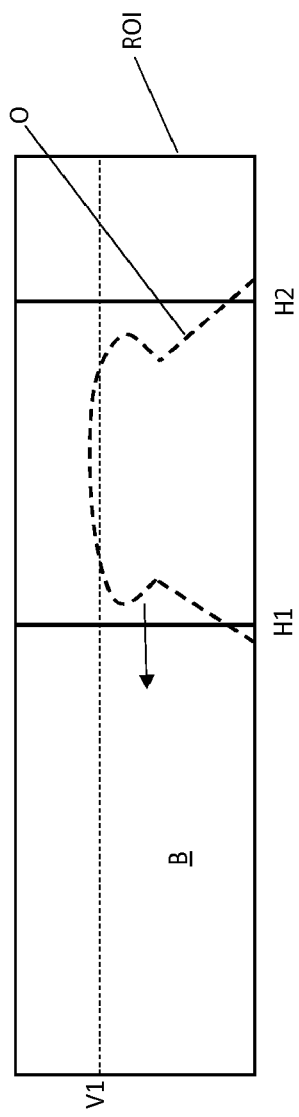
FIGS. 17-19 illustrate a non-uniform sub-division of a region of interest from one level of the hierarchy to the next.
Figure 18:
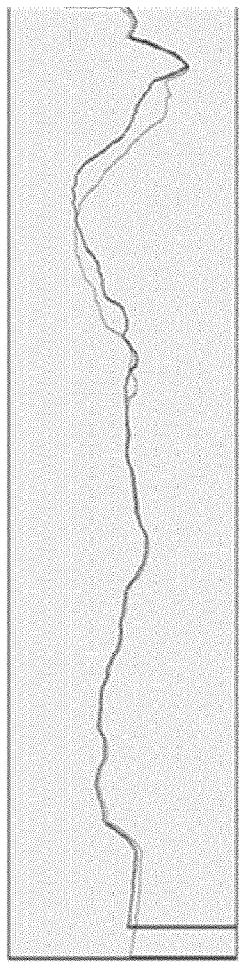

Referring to FIG. 17, which illustrates a region of interest (ROI) in which an object (O) towards the centre of the region is moving relative to the background (B). FIG. 18 shows two integral profiles, typical of those determined for horizontal displacement in such a region of interest.

Figure 19:
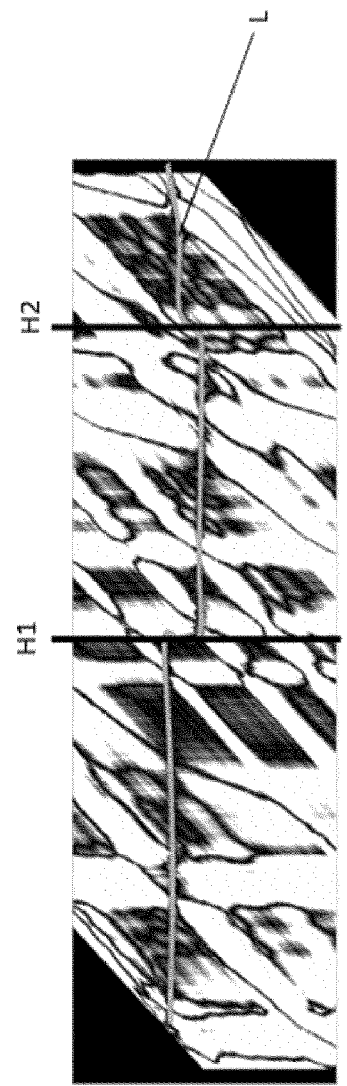

FIG. 19 is a two dimensional map illustrating the error value along the profiles versus horizontal displacement. The horizontal dimension is the length of the profiles while vertical dimension is the displacement. The black top-left and bottom-right corners are due to non-overlapping parts of the profiles and need not taken into consideration. It can be observed that there is line of minimum error (L) formed for certain displacements and this line can be found with some constrained optimization methods, such as linear or quadratic programming with geometric constraints or active contour methods like snakes or level-sets.

The vertical position of the line L indicates displacement. Where the line is near horizontal it denotes a moving object or background and sloped sections of the line denote uncertainty areas. In the example, the two sloped sections are used to find subdivision points H1, H2, in FIG. 17 for the region of interest. Again, the motion in the vertical direction and sub-divisions are found analogously to provide subdivision point V1 in FIG. 17. Thus in this case the region of interest is divided for the lower level of the hierarchy into 3 horizontal regions and 2 vertical regions.

It will be appreciated that this technique is also applicable in non-integral image based applications.

Many variants of the above described embodiment are possible. For example, most of today's mobile devices are equipped with motion sensors such as accelerometers and/or gyroscopes and these can be used to detect frame-to-frame camera displacement. The accuracy of these devices is limited and so typically, they do not allow for sub-pixel precision measurement of motion.

However, a built in motion sensor can provide a good way to reduce the number of levels required in the image hierarchy employed in the embodiment of FIG. 2 by providing an initial guess for the search and so avoid needing to calculate motion on all the levels of the hierarchy; or indeed to provide an initial estimate for background camera motion at any given level of the hierarchy.

Thus, knowing camera geometry and having measurements from the camera motion sensor(s), it is possible to calculate the motion in the sensor plane up to a given accuracy. So for example, the top level displacement calculation can be omitted from the embodiment illustrated in FIG. 2, and the motion calculated from the sensor measurements used as an initial guess for the second level (and possibly subsequent levels) for example as indicated in FIG. 6. This guarantees, or helps to confirm, global motion, in spite of moving objects. This is particularly useful for video stabilisation, as it helps to rule out the influence of objects moving inside the camera frame by providing a measure of real camera motion.

Thought of conversely, combining the approach illustrated in FIG. 2 with motion sensor information, provides a sub-pixel accuracy measure of motion where using a motion sensor alone could not do so.

The number of hierarchy levels that are needed to supplement the motion sensor(s) depends on the image size and the sensor accuracy. For example, if a sensor can provide accuracy +−3 pixels, at least two levels of hierarchy with a search radius of +−2 pixels at each level are required.

It will be appreciated that this technique is also applicable in non-integral image based applications.

Figure 14:
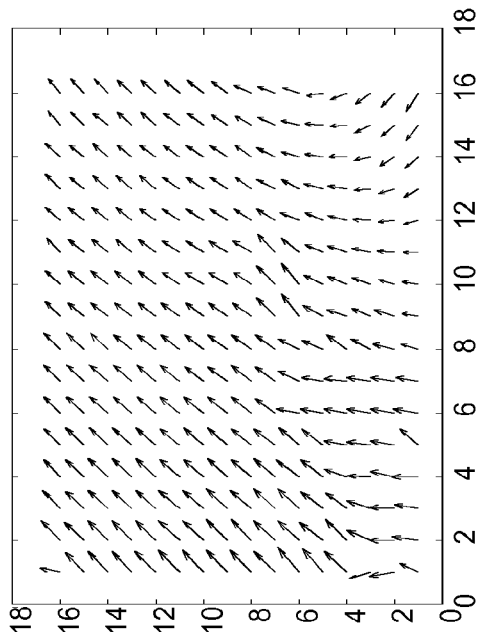
FIG. 14 shows a displacement matrix of motion vectors produced according to the method of FIG. 2.
Figure 16:
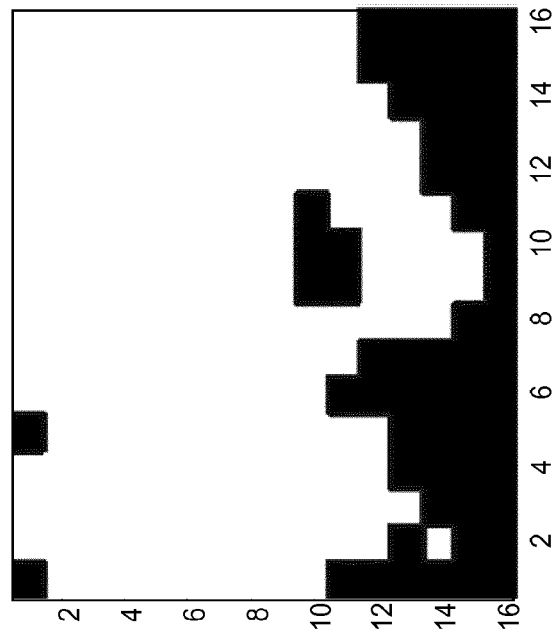
FIG. 16 shows a selection mask for the matrix of FIG. 14 produced by the method of FIG. 15.

In step 40 of FIG. 2, a displacement matrix comprising local motion vectors (each indicating local horizontal and vertical displacement, potentially with sub-pixel accuracy)

such as illustrated in FIG. 14 is provided by the HRE module 18 and can be written to memory 26.

However, having a matrix of local motion vectors showing displacements between two consecutive video frames may not be enough to provide reliable video stabilisation. In order for a module such as the GDE 22 to provide such stabilisation, it would usually determine a geometrical transformation between any two frames—this can expressed in any form, for example, matrix, quaternion or scale-rotation-translation. Again, details of the use of such transformation can be found in WO 2014/005783 (Reference: FN-384).

To obtain a geometrical transformation from a matrix of motion vectors such as shown in FIG. 14, a least squares or equivalent approach could be used. This approach would be sufficient if the displacement matrix contained relatively small measurement errors with a Gaussian distribution. Unfortunately, this is almost never the case. The motion vectors can be invalid in many ways, for example, they can contain local motion that comes from a moving object, rather than camera motion, or they could be erroneous due to lack of detail in a scene being imaged or repeating patterns that interfere with the correlation process. As such, using raw displacement matrix information determined for ROIs within a scene directly to provide a geometrical transformation would be likely to produce poor results.

It is possible to use methods such as RANSAC from Vision Research Lab, which rejects outliers from a vector set, to leave only vectors that form the most probable consistent motion. After such vectors are selected, least squares or equivalent can be used to estimate the final geometrical transformation from the remaining vectors. However, methods such as RANSAC are computationally intensive and may pose significant load to the processor of a mobile device. Other drawbacks of RANSAC are that:

it is iterative, with unknown and varying number of repetitions which can make processor load high and unpredictable; and it is stochastic, so that for the same set of vectors, two consecutive runs can produce slightly different results.

Embodiments of the present invention reduce the computational complexity of matrix estimation by several orders of magnitude, with predictable execution time and providing repeatable results as explained below.

Figure 15:
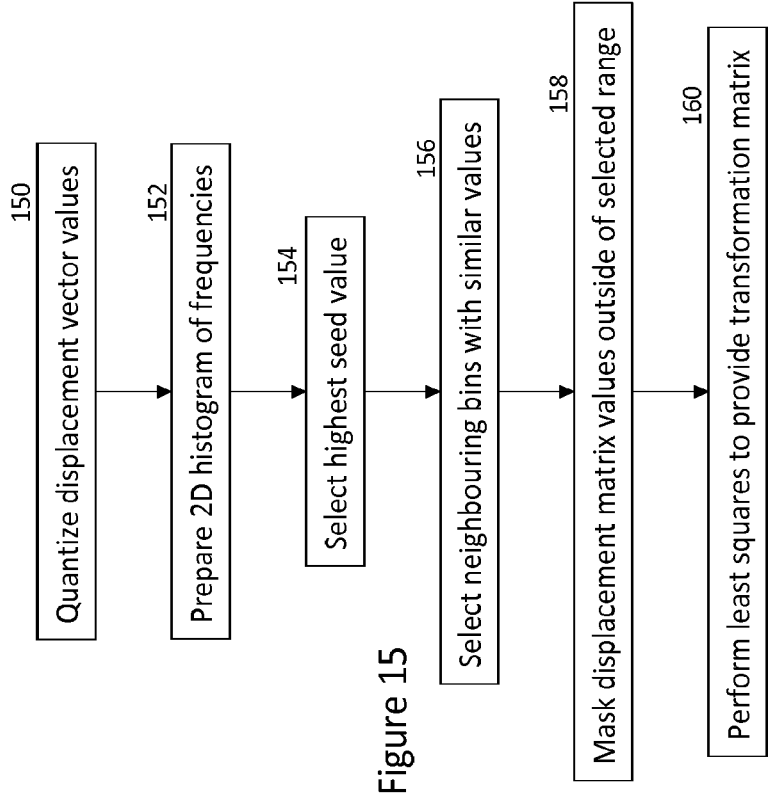
FIG. 15 illustrates a method for selecting vectors from the matrix for use in calculating a global transformation matrix.

Referring to FIG. 15, the values of the motion vectors from FIG. 14 are first quantized into integer values, step 150. The level of quantization depends on the desired accuracy and the expected range of motion within the frame. In the simplest case, the quantization might be performed as rounding to the nearest integer value, but other quantization bins can be used.

In step 152, a comparagram is built. This is 2D histogram in which each dimension represents the quantized motion in horizontal and vertical direction respectively and the value of the comparagram bin shows frequency of vectors sharing the same quantized motion values in both horizontal and vertical directions.

In step 154, a maximum bin value within the comparagram is found. The position of the maximum becomes a seed for a growing a region connecting neighbouring bins based on the similarity of their value to the value of the seed, step 156.

All motion vectors within the displacement matrix that fall into marked bins are selected for motion estimation, step 158. The final motion estimation can be performed using standard least squares method, step 160. A sample selected vectors mask for the matrix of FIG. 14 is shown in FIG. 15. This compares favourably with results provided by for example RANSAC albeit employing more rationalised and deterministic processing resources.

It will be appreciated that still further variants of the above disclosed embodiments are possible.

For example, it will be noted that for the reference image, see FIG. 8, integral image values are only required from the boundaries of regions of interest within the image. Thus, in some embodiments of the present invention, a Reduced Integral Image (RII) is stored in memory for every second acquired image. Each such image is used as the reference image knowing that the required integral image profiles can be built from the samples coinciding with the boundaries illustrated in FIG. 8 RHS. On the other hand, a complete II is stored for the alternate target images as the boundaries used for regions of interest vary according to the displacement calculated for higher levels of the hierarchy as can be seen for FIG. 8 LHS.

The complete integral image can of course be used by other processing modules including a face detector (not shown) and as disclosed in WO2008/018887 (Reference: FN-143), such detectors do not always require an integral image for every frame—thus embodiments of the present invention employing an RII do not necessarily impose a greater processing burden on a device which might already be performing face detection.

In any case, when using an RII, the generator 16 alternately writes to memory 24, a full Integral Image (frame N) and a Reduced II (frame N+1); then II (frame N+2) and RII (frame N+3).

The HRE module 18 uses II(N) and RII(N+1) from memory 24 to produce the displacement map for frame N+1; and then uses RII(N+1) and II(N+2) from memory 24 to produce the displacement map for frame N+2.

Again, it will be appreciated that while the illustrated embodiment divides regions by two from level to level, sub-divisions other than divided by 2, as well as non-uniform sub-divisions could be used in variants of the embodiment.

It will be noted that allowing an arbitrary scaling factor would require reading interpolated values from the integral image and this would increase complexity and reduce bandwidth gain, but nonetheless, such implementations would still perform better than the standard approach.

The invention claimed is:

1. A method of estimating motion between a pair of image frames of a given scene comprising:
   a) calculating respective integral images for each of said image frames;
   b) selecting at least one corresponding region of interest, within each frame;
   c) for each region of interest:
      i. calculating an integral image profile from each integral image, each profile comprising an array of elements, each element comprising a sum of pixel intensities from successive swaths of said region of interest for said frame;
      ii. correlating said integral image profiles to determine a relative displacement of said region of interest between said pair of frames; and
      iii. dividing each region of interest into a plurality of further regions of interest; and repeating step c) until a required hierarchy of estimated motion for successively divided regions of interest is provided,
   wherein said calculating an integral image profile comprises sub-sampling said integral image at a first sub-sampling interval at a first selected level of said required hierarchy.

2. A method according to claim 1 wherein step b) comprises initially selecting a complete image frame as a region of interest.

3. A method according to claim 1 wherein said dividing comprises dividing each region horizontally and vertically into an integer number of regions of interest.

4. A method according to claim 3 wherein said integer number is 2.

5. A method according to claim 1 comprising designating a first of said image frames as a reference frame and a second of said image frames as a target frame, said method further comprising: displacing said divided regions of said target frame at one level of said hierarchy according to a relative displacement determined for a region of interest corresponding to said divided regions of interest at a higher level of the required hierarchy.

6. A method according to claim 5 wherein said displacing is responsive to said correlating determining more than one displacement within said region of interest for displacing said divided regions of interest within said target image differently according to said more than one displacement.

7. A method according to claim 5 wherein said dividing is responsive to said correlating determining more than one displacement within said region of interest for determining a non-uniform division of said region of interest and for dividing said region of interest differently according to said non-uniform division.

8. A method according to claim 5 comprising calculating a full size integral image for a target frame and calculating a reduced size integral image for a reference frame, said reduced size integral image comprising only integral image data for pixels of said reference frame corresponding to boundaries of regions of interest within said required hierarchy.

9. A method according to claim 8 comprising selecting said reference and target frames from a sequence of image frames so that said reference frame alternately precedes and succeeds said target frame.

10. A method according to claim 5 further comprising receiving from a camera motion sensor, a measure of camera movement between said pair of image frames; and wherein said selecting comprises selecting a plurality of regions within said image, at least one region of interest within said target frame being displaced according to said measure of camera movement.

11. A method according to claim 1 comprising sampling each pixel of said integral image at a bottom level of said required hierarchy.

12. A method according to claim 11 further comprising interpolating said integral image profiles for each of said image frames at bottom level of said hierarchy to provide a sub-pixel measure of displacement for regions of interest at the bottom level of said required hierarchy.

13. A method according to claim 1, comprising generating a geometrical transformation indicating a relative movement of said pair of frames, based on an array of motion vectors determined for regions of interest at a bottom level of said required hierarchy.

14. A method according to claim 13 comprising filtering said motion vectors prior to said generating to eliminate outlying motion vectors.

15. A method according to claim 1 wherein for each repetition of step c), said sub-sampling intervals are halved.

16. A method according to claim 1, wherein said displacement comprises one or both of vertical or horizontal relative displacement.

17. A method of estimating motion between a pair of image frames of a given scene comprising:
 a) at least one corresponding region of interest within each frame;
 b) for each region of interest:
  i. correlating image information for said regions of interest to determine a relative displacement of said region of interest between said pair of frames;
  ii. dividing each region of interest into a plurality of further regions of interest, said dividing being responsive to said correlating determining more than one displacement within said region of interest for determining a non-uniform division of said region of interest and for dividing said region of interest differently according to said non-uniform division; and
 repeating step b) until a required hierarchy of estimated motion for successively divided regions of interest is provided.

18. A method of estimating motion between a pair of image frames of a given scene comprising:
 a) designating a first of said image frames as a reference frame and a second of said image frames as a target frame,
 b) selecting at least one corresponding region of interest within each frame;
 c) for each region of interest:
  i. correlating image information for said regions of interest to determine a relative displacement of said region of interest between said pair of frames;
  ii. dividing each region of interest into a plurality of further regions of interest; and
  iii. displacing said divided regions of said target frame at one level of said hierarchy according to a relative displacement determined for a region of interest corresponding to said divided regions of interest at a higher level of the hierarchy, said displacing being responsive to said correlating determining more than one displacement within said region of interest for displacing said divided regions of interest within said target image differently according to said more than one displacement; and
 repeating step c) until a required hierarchy of estimated motion for successively divided regions of interest is provided,
 wherein said dividing is responsive to said correlating determining more than one displacement within said region of interest for determining a non-uniform division of said region of interest and for dividing said region of interest differently according to said non-uniform division.

19. A method of estimating motion between a pair of image frames of a given scene comprising:
 a) designating a first of said image frames as a reference frame and a second of said image frames as a target frame,
 b) selecting at least one corresponding region of interest within each frame;
 c) for each region of interest:
  i. correlating image information for said regions of interest to determine a relative displacement of said region of interest between said pair of frames;
  ii. dividing each region of interest into a plurality of further regions of interest; and
  iii. displacing said divided regions of said target frame at one level of said hierarchy according to a relative displacement determined for a region of interest corresponding to said divided regions of interest at a higher level of the hierarchy, said displacing being responsive to said correlating determining more than one displacement within said region of interest, including using a determined relative displacement at one level of the hierarchy as a basis for an initial estimate of the relative displacement for a next lower level of the hierarchy; and repeating step c) until a required hierarchy of estimated motion for successively divided regions of interest is provided, wherein said dividing is responsive to said correlating determining more than one displacement within said region of interest for determining a non-uniform division of said region of interest and for dividing said region of interest differently according to said non-uniform division.

* * * * *